US008245015B2

(12) United States Patent  
Ishii

(10) Patent No.: US 8,245,015 B2  
(45) Date of Patent: Aug. 14, 2012

(54) PROCESSOR MONITORING EXECUTION OF A SYNCHRONIZATION INSTRUCTION ISSUED TO EXECUTION SECTIONS TO DETECT COMPLETION OF EXECUTION OF PRECEDING INSTRUCTIONS IN AN IDENTIFIED THREAD

(75) Inventor: Masaaki Ishii, Kanagawa (JP)

(73) Assignee: Sony Corporation, Tokyo (JP)

( * ) Notice: Subject to any disclaimer, the term of this patent is extended or adjusted under 35 U.S.C. 154(b) by 495 days.

(21) Appl. No.: 12/498,536

(22) Filed: Jul. 7, 2009

(65) Prior Publication Data

US 2010/0011195 A1    Jan. 14, 2010

(30) Foreign Application Priority Data

Jul. 8, 2008  (JP) ................................ 2008-177520

(51) Int. Cl.  
*G06F 9/38* (2006.01)

(52) U.S. Cl. ................... 712/214; 712/23; 712/E9.045; 718/107

(58) Field of Classification Search .................. None  
See application file for complete search history.

(56) References Cited

U.S. PATENT DOCUMENTS

| 5,881,264 A * | 3/1999 | Kurosawa ..................... 712/217 |
| 2004/0230975 A1 | 11/2004 | Gewirtz et al. |
| 2007/0234018 A1* | 10/2007 | Feiste ........................... 712/229 |

FOREIGN PATENT DOCUMENTS

| JP | 11-306149 | 11/1999 |
| JP | 2005-316679 | 11/2005 |

* cited by examiner

*Primary Examiner* — Kenneth Kim  
(74) *Attorney, Agent, or Firm* — Wolf, Greenfield & Sacks, P.C.

(57) ABSTRACT

A processor includes a plurality of executing sections configured to simultaneously execute instructions for a plurality of threads, an instruction issuing section configured to issue instructions to the plurality of executing sections, and an instruction sync monitoring section configured to, when an instruction-synchronizing instruction is issued to one or more of the plurality of executing sections from the instruction issuing section, monitor completion of execution of the instruction-synchronizing instruction for each of the executing sections, to which the instruction-synchronizing instruction has been issued, thus detecting completion of execution of preceding instructions for the thread to which the instruction-synchronizing instruction belongs. After issuing the instruction-synchronizing instruction, the instruction issuing section stops issuance of succeeding instructions for the thread to which the instruction-synchronizing instruction belongs, until the completion of execution of the preceding instructions for the thread to which the instruction-synchronizing instruction belongs is detected by the instruction sync monitoring section.

12 Claims, 14 Drawing Sheets

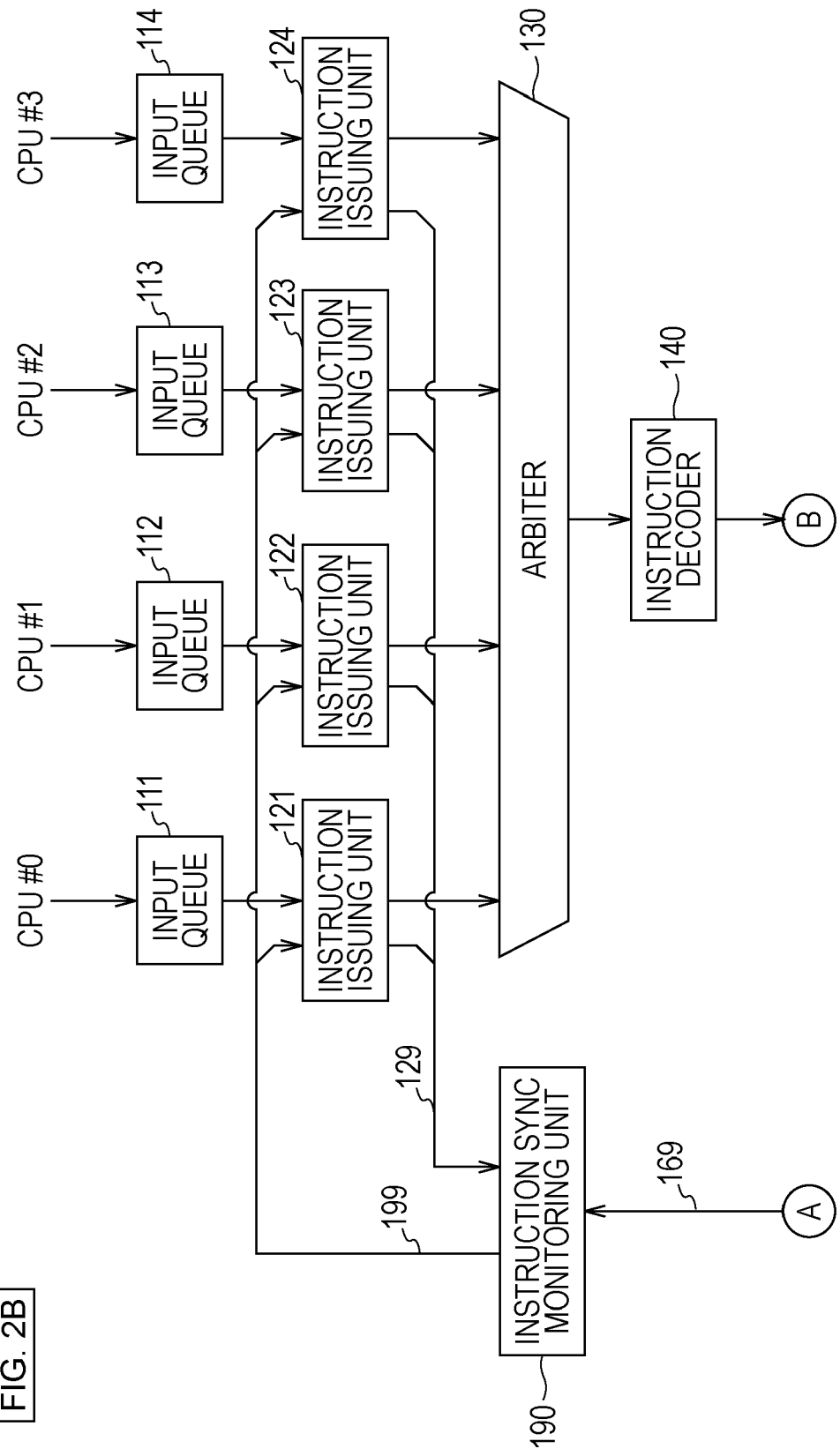

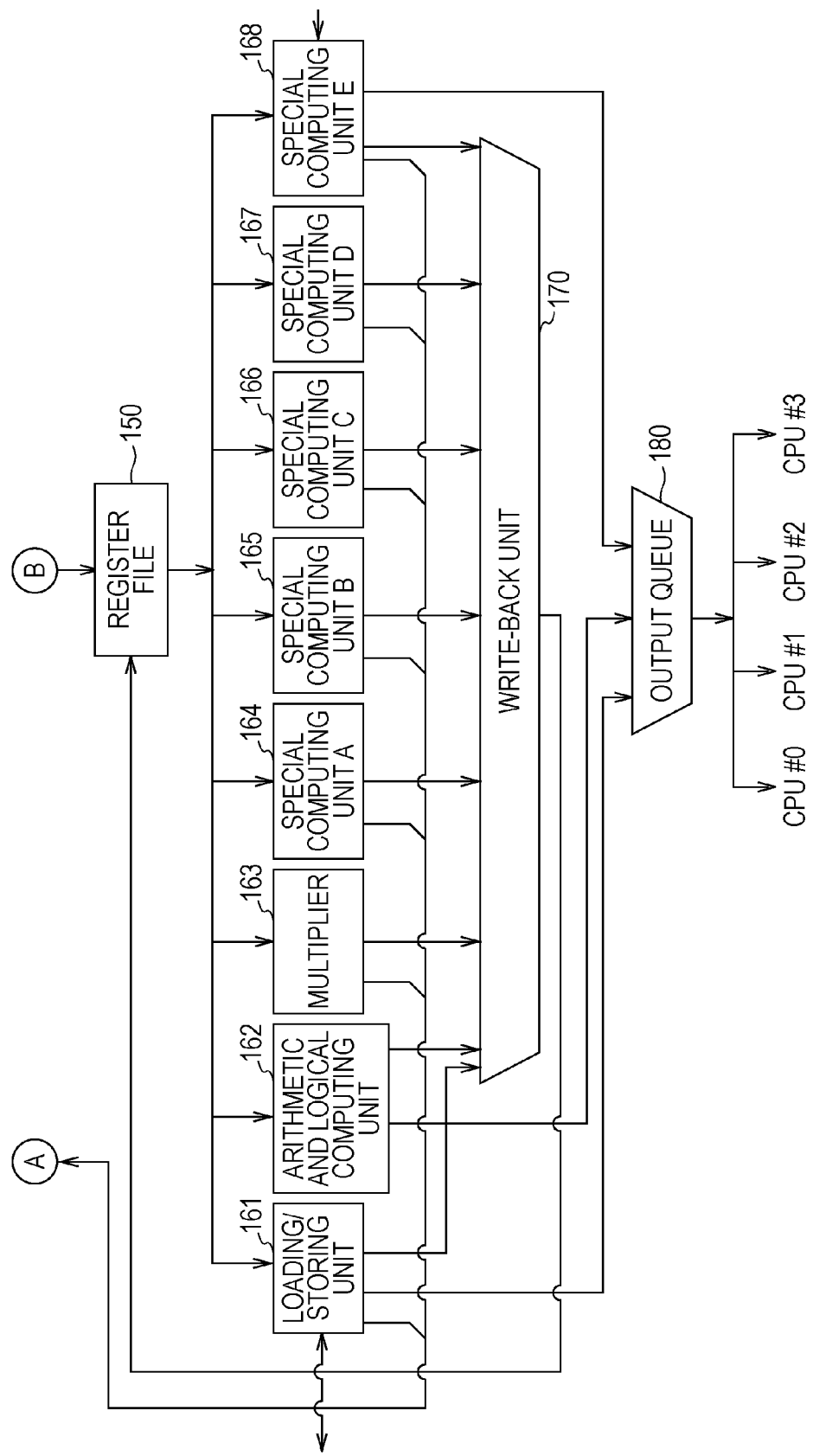

THREAD #X

INSTRUCTION #0

INSTRUCTION #1

INSTRUCTION #2

INSTRUCTION #3

INSTRUCTION #4

INSTRUCTION #5

⋮

INSTRUCTION # i     ↑ (WAIT FOR SYNC)
─────────────────────────
INSTRUCTION-SYNCHRONIZING
INSTRUCTION

INSTRUCTION # j

⋮

PROCESSOR MONITORING EXECUTION OF A SYNCHRONIZATION INSTRUCTION ISSUED TO EXECUTION SECTIONS TO DETECT COMPLETION OF EXECUTION OF PRECEDING INSTRUCTIONS IN AN IDENTIFIED THREAD

BACKGROUND OF THE INVENTION

1. Field of the Invention

The present invention relates to a processor, and more particularly to a processor having, as an instruction set, an instruction-synchronizing instruction that synchronizes the completion of execution of instructions, and to a processing method for the synchronization.

2. Description of the Related Art

In a processor for successively executing instructions, executing sections of the processor are often necessary to complete, until a certain point in time, execution of issued instructions. Such an operation of waiting for the completion of execution of instructions is called "instruction synchronization (sync)". The instruction sync is necessary, for example, when a debugger carries out step execution in which instructions are executed one by one, or when it is to be positively assured that an instruction execution result has been output to an external memory, etc. The instruction sync can be realized by preparing an instruction-synchronizing instruction to execute the instruction sync in instruction sets for a processor, and causing the processor to execute the instruction-synchronizing instruction when the instruction sync is necessary.

Hitherto, in a processor capable of executing a plurality of threads in parallel, various techniques have been proposed as methods for performing the instruction sync for some thread. One of the proposed techniques is to realize the instruction sync, for example, by stopping instruction issuance for all the threads and waiting for until all executing sections complete instructions under execution at the time and come into an idle state (see, e.g., USP Application Publication No. 2004/023975 (FIG. 3)).

SUMMARY OF THE INVENTION

With the above-described related art, however, because instruction issuance for all the threads is stopped to bring all the executing sections to come into the idle state, not only the thread as a target of the instruction sync, but also the other threads than the target of the instruction sync are stopped. Therefore, instruction execution performance of the processor deteriorates to a large extent.

In contrast, if all the executing sections of the processor can monitor all the instructions under execution and can discriminate the thread which is a source issuing the instructions under execution, it is possible to stop the execution of only the thread as the target of the instruction sync. Such a solution, however, necessitates a circuit for comparing the threads as sources issuing the instructions, which are under execution in all the executing sections of the processor, with the thread as the target of the instruction sync. Stated another way, the foregoing solution is not realistic because the circuit scale of the processor is greatly increased.

The present invention addresses the above-identified problems by performing instruction sync without stopping execution of other threads for which the instruction sync is not performed.

According to an embodiment of the present invention, a processor includes a plurality of executing sections configured to simultaneously execute instructions for a plurality of threads, an instruction issuing section configured to issue instructions to the plurality of executing sections, and an instruction sync monitoring section configured to, when an instruction-synchronizing instruction is issued to one or more of the plurality of executing sections from the instruction issuing section, monitor completion of execution of the instruction-synchronizing instruction for each of the executing sections, to which the instruction-synchronizing instruction has been issued, thus detecting completion of execution of preceding instructions for the thread to which the instruction-synchronizing instruction belongs, wherein after issuing the instruction-synchronizing instruction, the instruction issuing section stops issuance of succeeding instructions for the thread to which the instruction-synchronizing instruction belongs, until the completion of execution of the preceding instructions for the thread to which the instruction-synchronizing instruction belongs is detected by the instruction sync monitoring section. With those features, the issuance of succeeding instructions for the thread to which the instruction-synchronizing instruction belongs is stopped until the completion of execution of the preceding instructions for the thread to which the instruction-synchronizing instruction belongs is detected.

In the embodiment of the present invention, the instruction-synchronizing instruction may include a thread identifier field indicating an identifier of the thread to which the instruction-synchronizing instruction belongs, and an executing-section designation field designating one or more of the plurality of executing sections for which the completion of execution of the preceding instructions is to be detected, and the instruction sync monitoring section detects that the execution of the preceding instructions, which belong to the thread indicated in the thread identifier field, has been completed in the one or more of the plurality of executing sections, which are designated in the executing-section designation field. With those features, the instruction sync monitoring section can detect that the execution of the preceding instructions, which belong to the thread indicated in the thread identifier field, have been completed in the one or more of the executing sections, which are designated in the executing-section designation field.

In the above-described processor, the instruction sync monitoring section may include a completion-of-execution record section configured to record, per thread, whether the execution of the preceding instructions in each of the plurality of executing sections has been completed, and a completion-of-execution detecting section configured to detect the completion of execution of the preceding instructions in all ones of the plurality of executing sections, which are designated in the executing-section designation field, by comparing the record in the completion-of-execution record section with the designation in the executing-section designation field. With those features, the completion-of-execution detecting section can detect the completion of execution of the preceding instructions based on the record in the completion-of-execution record section.

In the above-described processor, the completion-of-execution detecting section may include a selector configured to select detection or non-detection of the completion of execution of the preceding instructions, which is recorded in the completion-of-execution record section, in accordance with the thread identifier field, a comparator configured to compare the detection or the non-detection of the completion of execution of the preceding instructions, which has been selected by the selector, with the designation of one or more of the executing sections, which are indicated in the executing-section designation field, and an output section configured to output, as a detection result of the completion-of-execution detecting section, a result of the comparison when the instruction-synchronizing instruction is issued by the instruction issuing section. With those features, the result of the comparison between the selected detection or non-detection of the completion of execution of the preceding instructions and the designation of one or more of the executing sections, which are indicated in the executing-section designation field, can be output as the detection result of the completion-of-execution detecting section.

The embodiment of the present invention provides the advantage that the instruction sync can be performed without stopping execution of other threads for which the instruction sync is not performed.

BRIEF DESCRIPTION OF THE DRAWINGS

FIGS. 2A and 2B are each a block diagram illustrating one example of configuration of a processor 100 according to the embodiment of the present invention;

DESCRIPTION OF THE PREFERRED EMBODIMENTS

An embodiment of the present invention will be described in detail below with reference to the drawings.

Figure 1:
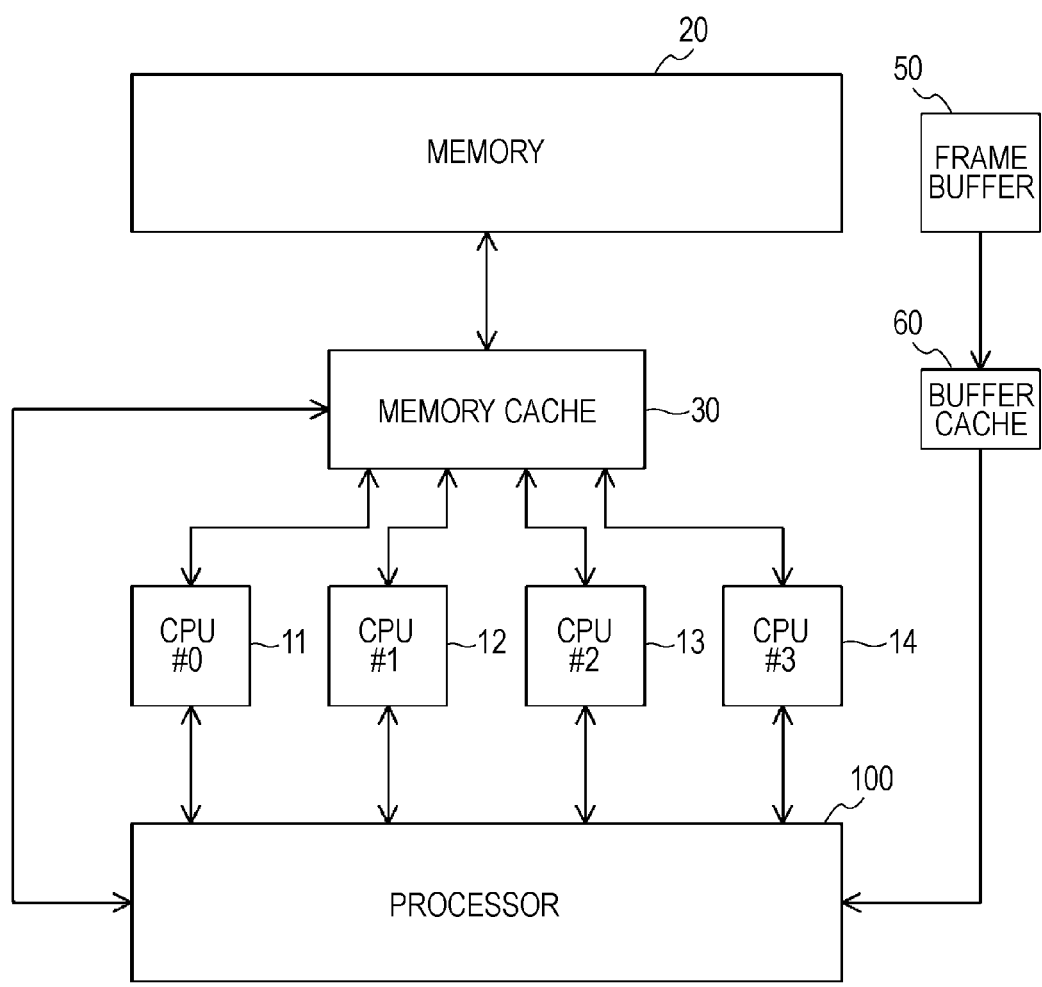
FIG. 1 is a block diagram illustrating one example of entire configuration of an information processing system according to an embodiment of the present invention.

FIG. 1 is a block diagram illustrating one example of entire configuration of an information processing system according to an embodiment of the present invention. The information processing system includes a plurality of CPUs 11 to 14, a memory 20, a memory cache 30, a frame buffer 50, a buffer cache 60, and a processor 100.

The CPUs 11 to 14 are CPUs (Central Processing Units) that execute processing in parallel. It is here assumed that the CPUs 11 to 14 execute different threads and instruct the processor 100 to execute computation processes if necessary.

The memory 20 is a common memory holding a working area for the CPUs 11 to 14. The memory cache 30 is a common cache memory 30 holding a copy of a partial area of the memory 20.

The frame buffer 50 is a buffer holding a frame that is handled as a target of image processing. The buffer cache 60 is a cache memory holding a copy of a partial area of the frame buffer 50. When the processor 100 is used as a moving-image codec engine, the buffer cache 60 is used as a buffer for referring to a decoded image in an intra-frame prediction process, and it functions as a read only buffer.

The processor 100 is a co-processor which is shared by the CPUs 11 to 14 and which execute computation processes in accordance with instructions from the CPUs 11 to 14. Between the processor 100 and the CPUs 11 to 14, sync of data is established at a level of the memory 20 or the memory cache 30. The following description is made for an example in which the processor 100 is used as a moving-image codec engine.

FIGS. 2A and 2B are each a block diagram illustrating one example of configuration of the processor 100 according to the embodiment of the present invention. The processor 100 includes input queues 111 to 114, instruction issuing units 121 to 124, an arbiter 130, an instruction decoder 140, and a register file 150. Further, the processor 100 includes a loading/storing unit 161, an arithmetic and logical computing unit 162, a multiplier 163, special computing units A to E (164 to 168), a write-back unit 170, an output queue 180, and an instruction sync monitoring unit 190.

The input queues 111 to 114 are FIFO (First-In First-Out) queues holding instructions received from the CPUs 11 to 14. The input queues 111 to 114 correspond to the CPUs 11 to 14, respectively. The input queues 111 to 114 supply instructions to the instruction issuing units 121 to 124 in sequence in which the instructions have been received from the CPUs 11 to 14.

The instruction issuing units 121 to 124 are units issuing the instructions supplied from the input queues 111 to 114. The instruction issuing units 121 to 124 correspond to the input queues 111 to 114, respectively. Each of the instruction issuing units 121 to 124 may include a scoreboard for holding a dependence relation among data in the register file 150 for control of the dependence relation among data.

Further, upon an instruction-synchronizing instruction being issued, the instruction issuing units 121 to 124 temporarily stop the issuance of subsequent instructions in a thread to which the instruction-synchronizing instruction belongs. At that time, the instruction issuing units 121 to 124 request the instruction sync monitoring unit 190 to monitor instruction sync through a signal line 129. Upon completion of the instruction sync, the instruction issuing units 121 to 124 receive a notice indicating the completion of the instruction sync from the instruction sync monitoring unit 190 through a signal line 199. Responsively, the instruction issuing units 121 to 124 resume the issuance of the subsequent instructions.

The arbiter 130 arbitrates respective instructions issued from the instruction issuing units 121 to 124 and supplies them to the instruction decoder 140. The instruction decoder 140 decodes each instruction supplied from the arbiter 130 and specifies, for example, the computing unit which executes the decoded instruction or the register as an access target.

The input queues 111 to 114, the instruction issuing units 121 to 124, the arbiter 130, and the instruction decoder 140 serve as one example of an instruction issuing section stated in claims.

The register file 150 holds an internal register of the processor 100. A necessary operand is read out from the register file 150 in accordance with the result of decoding by the instruction decoder 140 and is supplied to the computing unit, etc.

The loading/storing unit 161 loads data from the memory 20 into the register file 150 and stores data from the register file 150 into the memory 20. The arithmetic and logical computing unit 162 is a computing unit that executes arithmetic operations, such as addition and subtraction, and logical operations, such as logical addition (OR) and logical multiplication (AND). The multiplier 163 is a computing unit that executes multiplication. The special computing units A to E (164 to 168) are computing units that execute special computations. Herein, the special computations are assumed to be macro block computations necessary for the moving-image codec. For example, the special computing units A and B (164 and 165) are assumed to execute an IDCT (Inverse Discrete Cosine Transform) computation. Also, the special computing unit C (166) is assumed to execute a deblocking filter computation. The special computing unit D (167) is assumed to execute an intra-frame prediction process. The special computing unit E (168) is assumed to execute an inter-frame prediction process. In this embodiment, because of assuming the moving-image codec, each computing unit, etc. are assumed to handle integer arithmetic.

As to a time necessary for each process, the following is assumed herein. The loading/storing unit 161 needs 5 cycles. The arithmetic and logical computing unit 162 needs 2 cycles. The multiplier 163 needs 4 cycles. The special computing units A and B (164 and 165) need 4 cycles. The special computing units C and D (166 and 167) need 5 cycles. The special computing unit E (168) needs 25 cycles or more depending on a function code. The function code is a code for designating the type of filter computation per codec process. In the following description, the loading/storing unit 161, the arithmetic and logical computing unit 162, the multiplier 163, and the special computing units A to E (164 to 168) are each called an executing section 160.

The write-back unit 170 writes back the results produced by the executing sections 160 into the register file 150. The output queue 180 outputs the results produced by the loading/storing unit 161, the arithmetic and logical computing unit 162, and the special computing unit E (168) to the CPUs 11 to 14.

When the instruction-synchronizing instruction is issued to the executing section 160, the instruction sync monitoring unit 190 detects that execution of preceding instructions in a thread to which the issued instruction-synchronizing instruction belongs have been completed in the executing section 160. For that purpose, the instruction sync monitoring unit 190 monitors the completion of execution of the instruction-synchronizing instruction for each executing section 160 to which the instruction-synchronizing instruction has been issued. Upon receiving an instruction sync monitoring request from one of the instruction issuing units 121 to 124 through the signal line 129, the instruction sync monitoring unit 190 starts to monitor the completion of execution of preceding instructions in a particular thread. When the completion of execution of the preceding instructions is reported from each executing section 160 through the signal line 169, the instruction sync monitoring unit 190 puts the completion of the execution on record in accordance with the report. Further, when the execution of the preceding instructions is completed in particular one of the executing sections 160, the instruction sync monitoring unit 190 notifies the establishment of sync to the one of the instruction issuing units 121 to 124, which has issued the instruction sync monitoring request, through the signal line 199. The instruction sync monitoring unit 190 is one example of an instruction sync monitoring section stated in claims.

Figure 3:
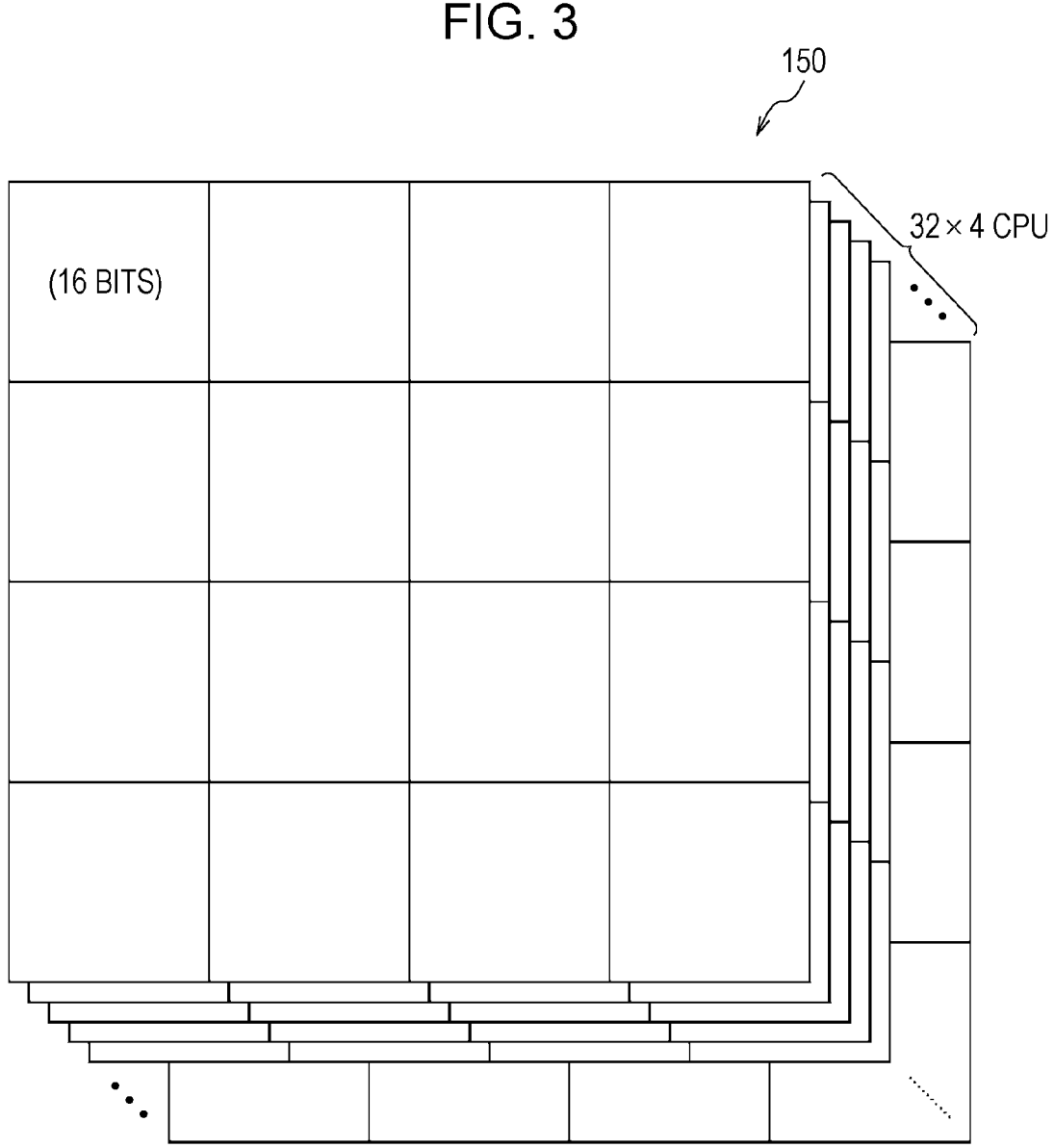
FIG. 3 illustrates one example of configuration of a register file 150 in the embodiment of the present invention.

FIG. 3 illustrates one example of configuration of the register file 150 in the embodiment of the present invention. The register file 150 is provided for each of the CPUs 11 to 14. This enables instructions to be executed without considering the data dependence relationships among the CPUs 11 to 14. It is herein assumed that 32 registers are provided for each of the four CPUs.

One register has a (4×4) matrix structure, and each matrix element is made up of 16 bits. Stated another way, each register has a plurality of elements like a vector register, and a computation process, etc. are basically executed in units of register. In this embodiment, because of assuming the moving-image codec, each matrix element is assumed to hold an integer.

Figure 4:
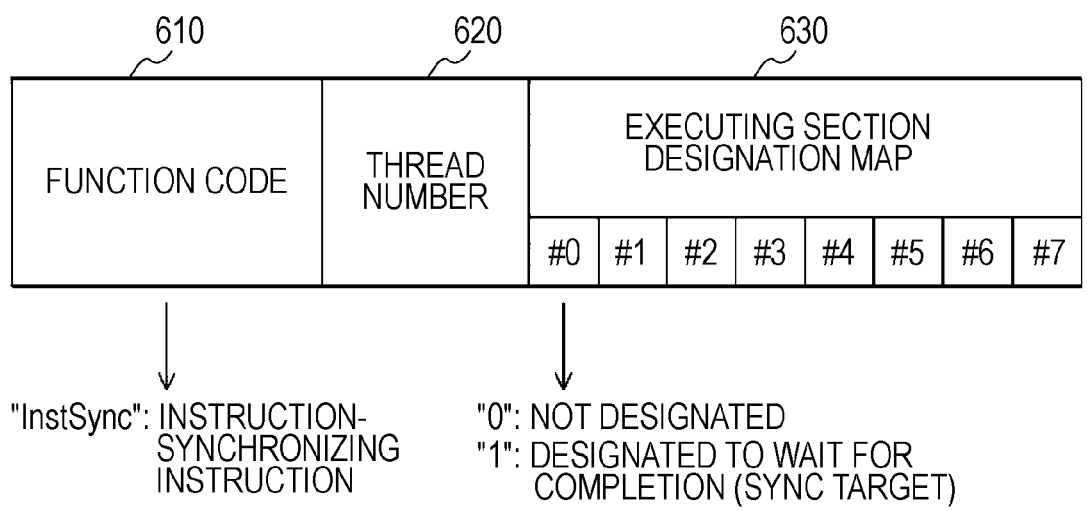
FIG. 4 illustrates one example of an instruction format of an instruction-synchronizing instruction in the embodiment of the present invention.

FIG. 4 illustrates one example of an instruction format of the instruction-synchronizing instruction in the embodiment of the present invention. The instruction format includes respective fields of a function code 610, a thread number 620, and an executing section designation map 630.

The function code 610 implies a field for holding a code assigned to an instruction. The instruction-synchronizing instruction is denoted by "InstSync", and a code of, e.g., about 8 bits is stored as the function code 610.

The thread number 620 implies a field for designating a thread that is the target of the instruction sync. In other words, the number of the thread to which the instruction-synchronizing instruction belongs is stored in the thread number 620. The thread number 620 is one example of a thread identifier field stated in claims.

The executing section designation map 630 implies a field for designating the executing section that is the target of the instruction sync. The executing section designation map 630 has a bit map in units of one bit corresponding to each of the executing sections 160, each bit indicating whether the relevant executing section 160 is the target of the instruction sync monitoring unit 190. More specifically, the zero-th bit corresponds to the loading/storing unit 161. The first bit corresponds to the arithmetic and logical computing unit 162. The second bit corresponds to the multiplier 163. The third bit corresponds to the special computing unit A (164). The fourth bit corresponds to the special computing unit B (165). The fifth bit corresponds to the special computing unit C (166). The sixth bit corresponds to the special computing unit D (167). The seventh bit corresponds to the special computing unit E (168). For example, when the loading/storing unit 161 is the target of the instruction sync, the zero-th bit is set to "1", and when it is not the target of the instruction sync, the zero-th bit is reset to "0".

Figure 5:
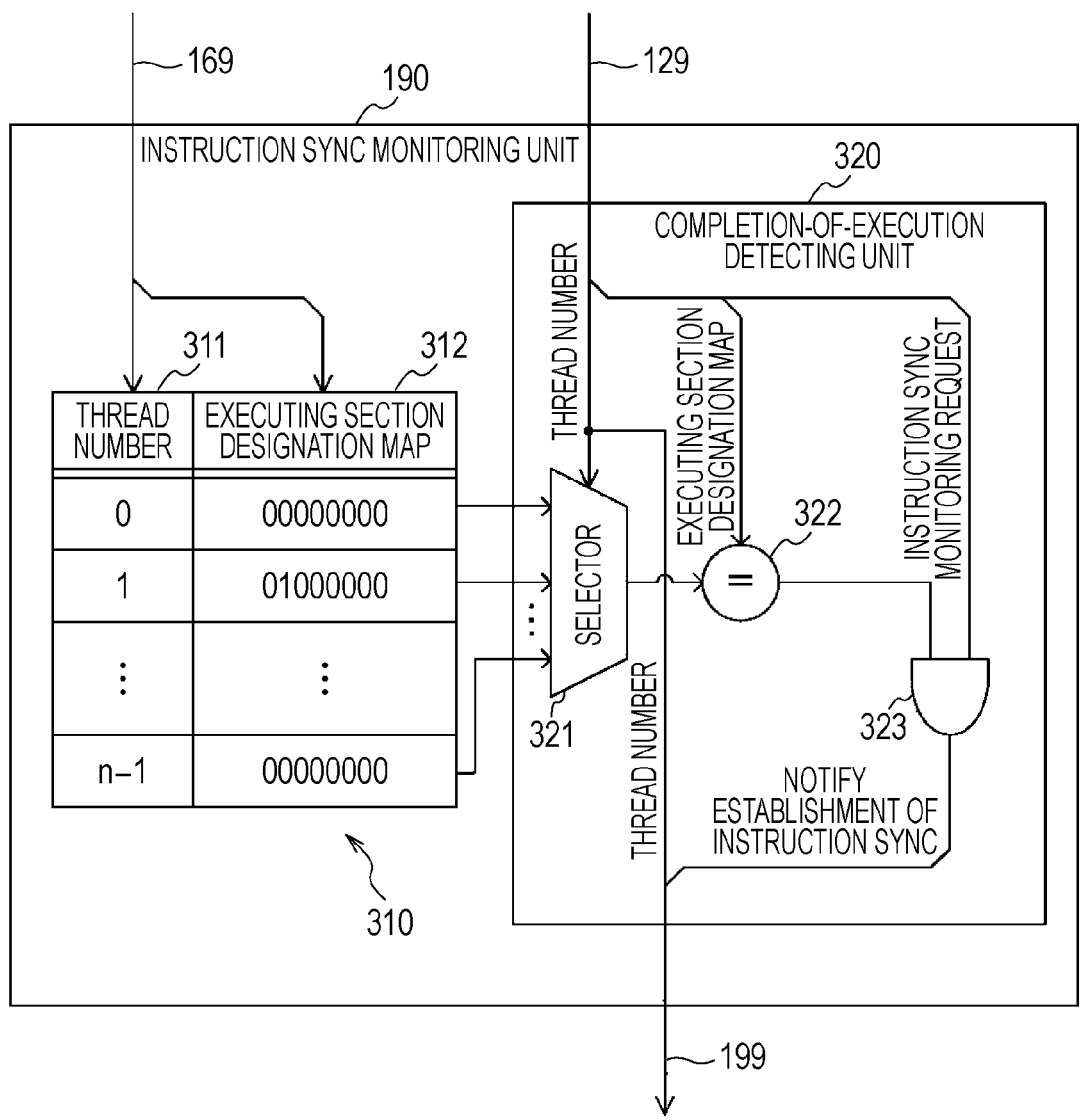
FIG. 5 is a block diagram illustrating one example of configuration of an instruction sync monitoring unit 190 in the embodiment of the present invention.

FIG. 5 is a block diagram illustrating one example of configuration of the instruction sync monitoring unit 190 in the embodiment of the present invention. The instruction sync monitoring unit 190 includes a completion-of-execution record table 310 and a completion-of-execution detecting unit 320.

The completion-of-execution record table 310 is a table for recording, per thread, whether the execution of the instructions preceding the instruction-synchronizing instruction is completed in each executing section 160. The completion-of-execution record table 310 includes respective fields for a thread number 311 and an executing section designation map 312. The thread number 311 implies a field for holding the thread number to which the instruction-synchronizing instruction belongs. The executing section designation map 312 is a bit map similar to the executing section designation map 630 in the instruction format and, it records therein the fact that the execution of the preceding instructions has been completed in the executing section 160. When each executing section 160 executes the instruction-synchronizing instruction, the executing section 160 reports, to the instruction sync monitoring unit 190, the fact that the execution of the instructions preceding the instruction-synchronizing instruction have been completed. The report includes the thread number of the instruction-synchronizing instruction. In response to the report, the instruction sync monitoring unit 190 sets, in an entry of the thread number 311 matched with the reported thread number, a bit in the bit map of the executing section designation map 312, which corresponds to the executing section 160 having reported the completion of the execution, to "1", for example. In the illustrated embodiment, "1" in the bit map of the executing section designation map 312 represents the completion of the execution, and "0" represents that the execution is not yet completed. The completion-of-execution record table 310 is one example of a completion-of-execution record section stated in claims.

The completion-of-execution detecting unit 320 detects, by referring to the completion-of-execution record table 310, that the execution of the preceding instructions has been completed in all the executing sections 160 designated in the executing section designation map 630. The completion-of-execution detecting unit 320 includes a selector 321, a comparator 322, and a logical multiplication (AND) circuit 323.

The selector 321 selects the executing section designation map 312 in the completion-of-execution record table 310 in accordance with the thread number 620 of the instruction-synchronizing instruction. The comparator 322 compares the executing section designation map 312 selected by the selector 321 with the executing section designation map 630 in the instruction-synchronizing instruction. At the time when the execution of the preceding instructions is completed in all the executing sections 160 which have been each designated as the synch target in the executing section designation map 630 in the instruction-synchronizing instruction, the contents of the executing section designation map 630 are in match with the contents of the executing section designation map 312. The comparator 322 detects the match between both the maps. The logical AND circuit 323 generates the logical product of the presence of the instruction sync monitoring request from each of the instruction issuing units 121 to 124 and the result of the comparator 322. More specifically, when the match between both the maps is detected by the comparator 322 in the presence of the instruction sync monitoring request, the logical AND circuit 323 notifies the establishment of the instruction sync to the instruction issuing units 121 to 124. The selector 321 is one example of a selector stated in claims. The logical AND circuit 323 is one example of an output section stated in claims.

Figure 6:
FIG. 6 illustrates one example of an instruction string including the instruction-synchronizing instruction in the embodiment of the present invention.

FIG. 6 illustrates one example of an instruction string including the instruction-synchronizing instruction in the embodiment of the present invention. When the instruction-synchronizing instruction is issued in an instruction string in some thread #X, the instruction issuing units 121 to 124 stop issuance of an instruction #j just succeeding the instruction-synchronizing instruction and other subsequent instructions in the thread #X. Then, the instruction issuing units 121 to 124 come into a sync waiting state for instructions in the thread #X until the completion of execution of instructions preceding the instruction-synchronizing instruction, i.e., of an instruction #i and other preceding instructions, in the thread #X. During the sync waiting state, the instruction issuing units 121 to 124 continue the issuance of instructions which belong to other threads. When the instruction sync monitoring unit 190 detects the completion of the execution of the instruction #i and other preceding instructions, the instruction issuing units 121 to 124 resume the issuance of the instruction #j and other succeeding instructions in the thread #X.

The operation of the processor 100 according to the embodiment of the present invention will be described below with reference to the drawings.

Figure 7:
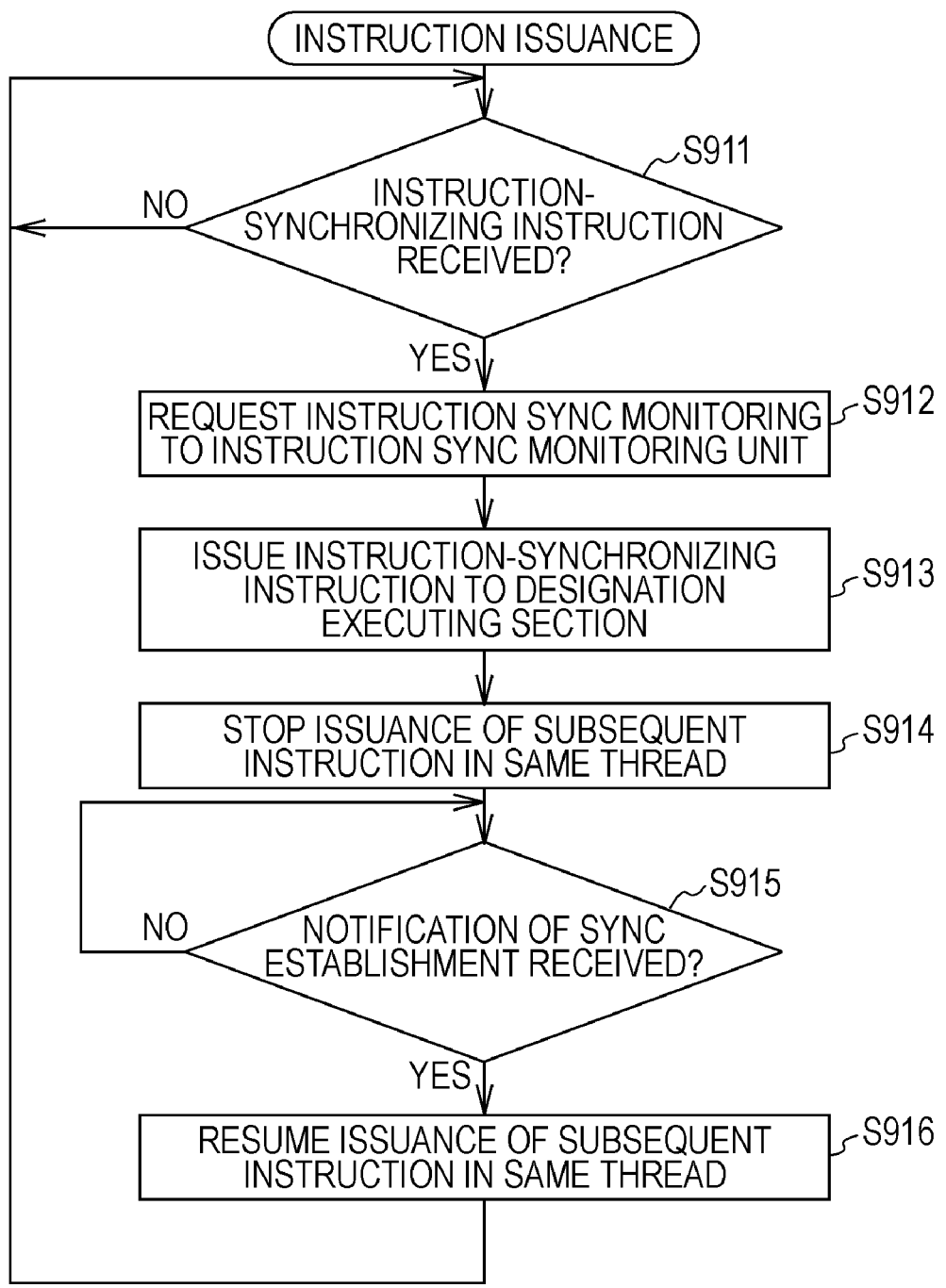
FIG. 7 is a flowchart illustrating one example of processing procedures executed by each of instruction issuing units 121 to 124 in the embodiment of the present invention.

FIG. 7 is a flowchart illustrating one example of processing procedures executed by each of the instruction issuing units 121 to 124 in the embodiment of the present invention.

Upon receiving the instruction-synchronizing instruction from one of the CPUs 11 to 14 (step S911), corresponding one of the instruction issuing units 121 to 124 requests the instruction sync monitoring unit 190 to monitor the instruction sync (step S912). The one of the instruction issuing units 121 to 124 issues the instruction-synchronizing instruction to each executing section 160 which is designated in the executing section designation map 630 in the instruction-synchronizing instruction (step S913). Then, the one of the instruction issuing units 121 to 124 stops the issuance of succeeding instructions in a thread (thread number 620) to which the instruction-synchronizing instruction belongs (step S914).

Thereafter, upon receiving the notice indicating the establishment of sync from the instruction sync monitoring unit 190 (step S915), the one of the instruction issuing units 121 to 124 resumes the issuance of the succeeding instructions in the thread (thread number 620) to which the instruction-synchronizing instruction belongs (step S916).

Figure 8:
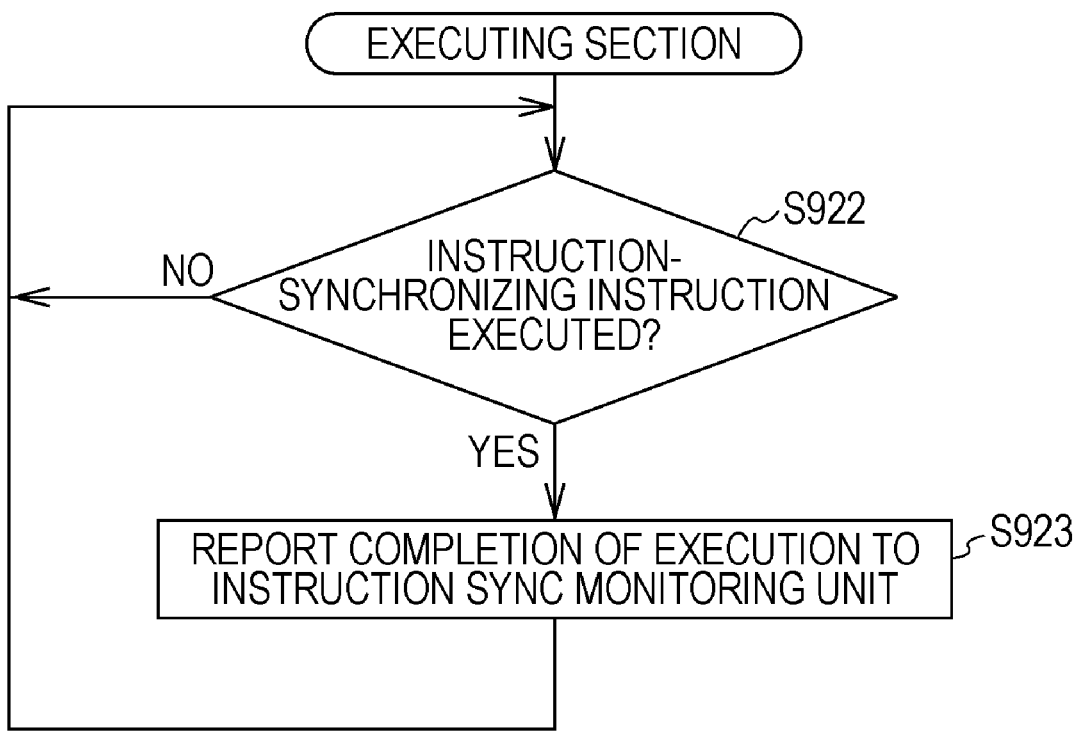
FIG. 8 is a flowchart illustrating one example of processing procedures executed by an executing section 160 in the embodiment of the present invention.

FIG. 8 is a flowchart illustrating one example of processing procedures executed by the executing section 160 in the embodiment of the present invention.

When the instruction-synchronizing instruction is issued from some one of the instruction issuing units 121 to 124, the executing section 160 executes the instruction-synchronizing instruction similarly to other instructions. If the instruction-synchronizing instruction is executed and completed (step S922), the executing section 160 reports, to the instruction sync monitoring unit 190, the fact that the execution of instructions preceding the instruction-synchronizing instruction has been completed in the relevant executing section 160 (step S923). Responsively, a corresponding bit of the executing section designation map 312 in the completion-of-execution record table 310 is set in the instruction sync monitoring unit 190.

Figure 9:
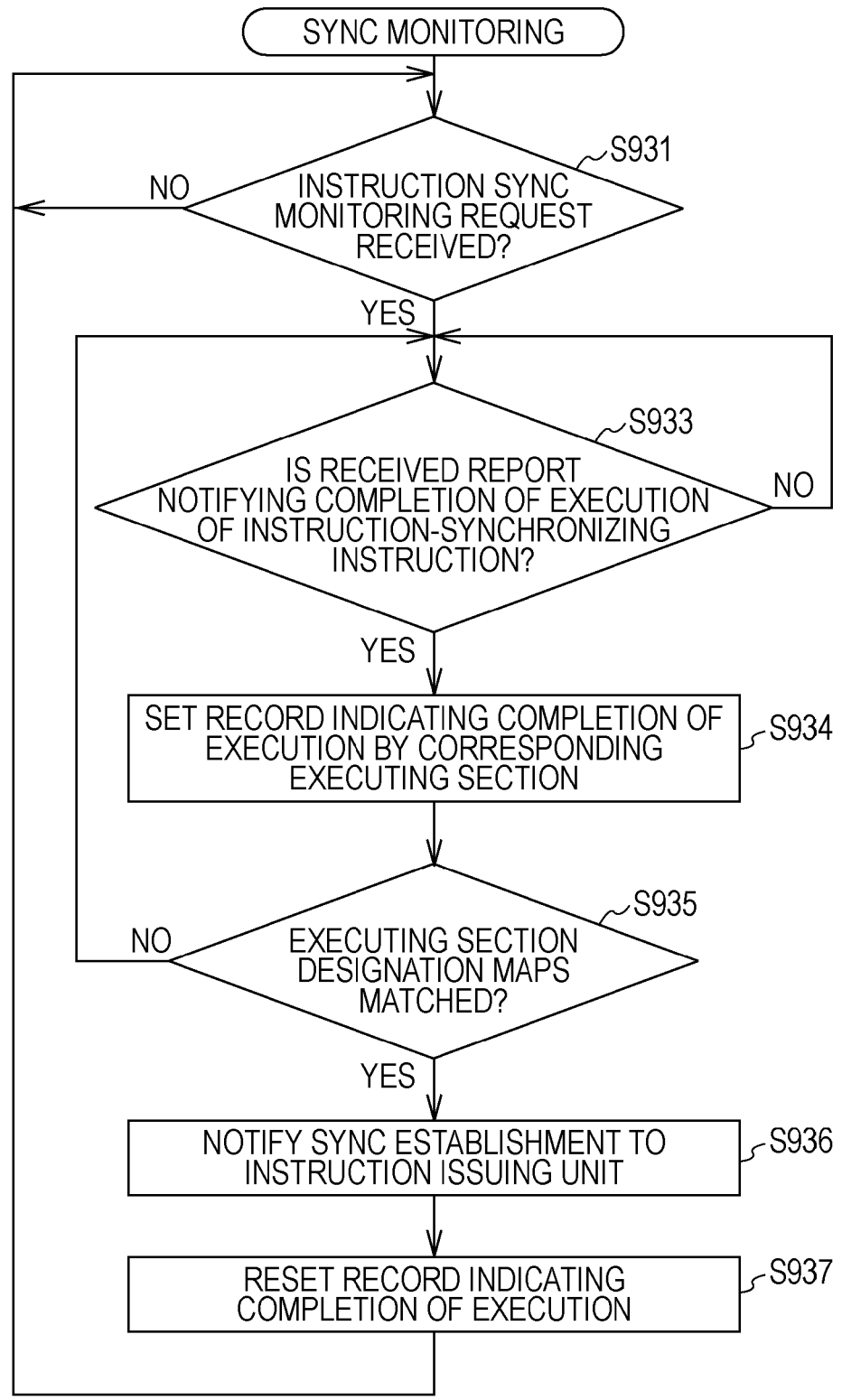
FIG. 9 is a flowchart illustrating one example of processing procedures executed by the instruction sync monitoring unit 190 in the embodiment of the present invention.

FIG. 9 is a flowchart illustrating one example of processing procedures executed by the instruction sync monitoring unit 190 in the embodiment of the present invention. It is here premised that all bits of the executing section designation map 312 in the completion-of-execution record table 310 are reset in advance.

Upon receiving the instruction sync monitoring request from some one of the instruction issuing units 121 to 124 (step S931), the instruction sync monitoring unit 190 starts monitoring of the instruction sync for the relevant thread. Upon receiving, in such a state, the report from the executing section 160 notifying that the execution of the instructions preceding the instruction-synchronizing instruction has been completed (step S933), the instruction sync monitoring unit 190 sets a corresponding bit in the executing section designation map 312 (step S934). In more detail, the instruction sync monitoring unit 190 sets, in the executing section designation map 312 in the completion-of-execution record table 310 for the corresponding thread, a bit corresponding to the executing section 160, which has reported the completion of the execution (step S934). After such setting, if a match between the executing section designation map 312 and the executing section designation map 630 is not detected by the comparator 322 (step S935), the processing subsequent to step S933 is repeated until the match between both the maps is detected.

If the match between the executing section designation map 312 and the executing section designation map 630 is detected by the comparator 322 (step S935), the instruction sync monitoring unit 190 notifies the detection of the match. Specifically, the instruction sync monitoring unit 190 notifies the establishment of the instruction sync to the relevant one of the instruction issuing units 121 to 124, which has issued the instruction-synchronizing instruction (step S936). Then, the instruction sync monitoring unit 190 resets the bits of the executing section designation map 312 in the completion-of-execution record table 310 for the corresponding thread (step S937).

Figure 10:
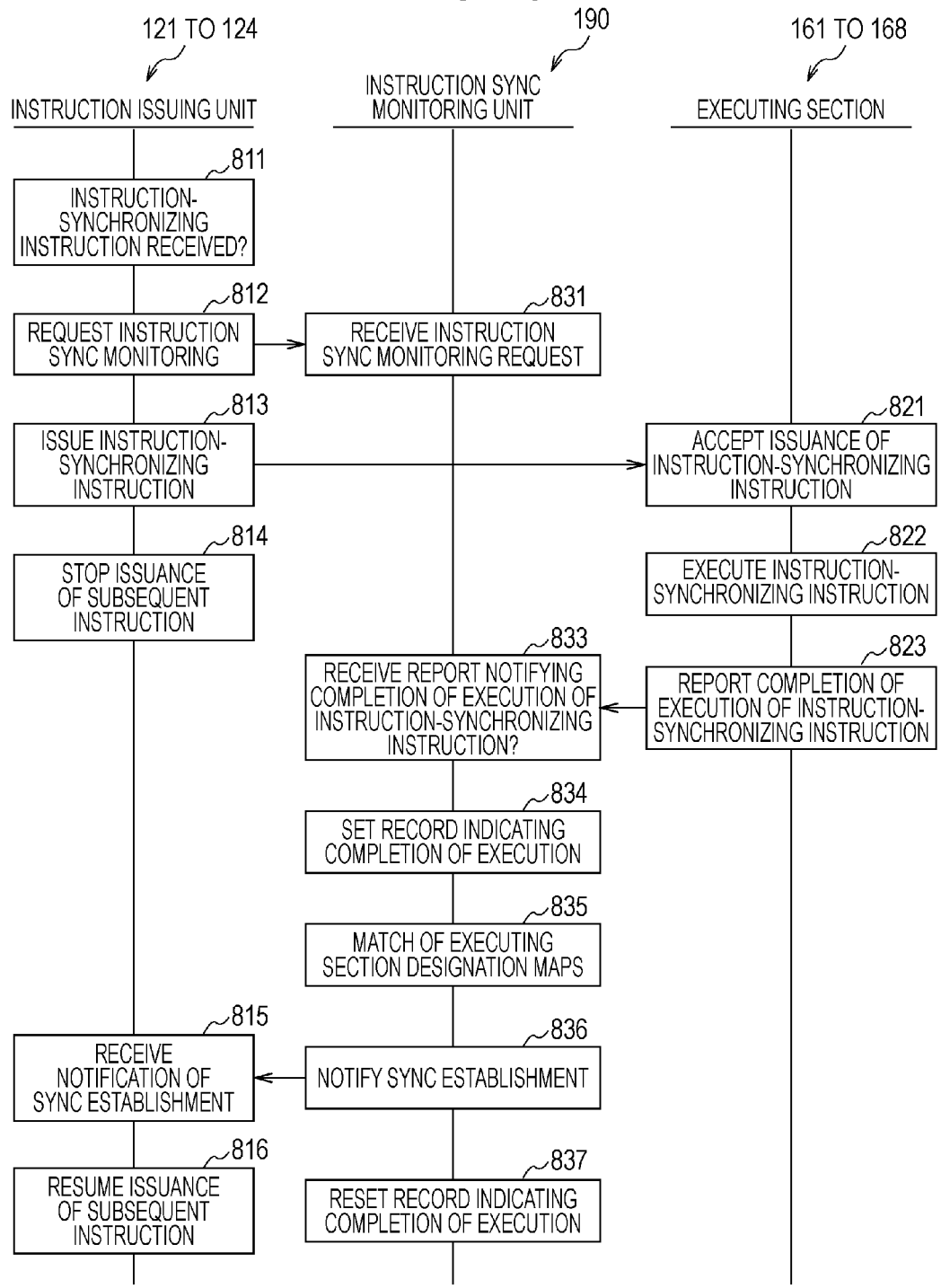
FIG. 10 illustrates one example of a sequence chart for the processor 100 according to the embodiment of the present invention.

FIG. 10 illustrates one example of a sequence chart for the processor 100 according to the embodiment of the present invention.

Upon receiving the instruction-synchronizing instruction from one of the CPUs 11 to 14 (811), corresponding one of the instruction issuing units 121 to 124 requests the instruction sync monitoring unit 190 to monitor the instruction sync (812). The one of the instruction issuing units 121 to 124 issues the instruction-synchronizing instruction to each executing section 160 which is designated in the executing section designation map 630 in the instruction-synchronizing instruction (813). Then, the one of the instruction issuing units 121 to 124 stops the issuance of succeeding instructions in a thread (thread number 620) to which the instruction-synchronizing instruction belongs (814).

Upon receiving the instruction sync monitoring request from some one of the instruction issuing units 121 to 124 (831), the instruction sync monitoring unit 190 starts monitoring of the instruction sync for the relevant thread.

When the instruction-synchronizing instruction is issued from some one of the instruction issuing units 121 to 124 and received (821), the executing section 160 executes the instruction-synchronizing instruction similarly to other instructions. If the instruction-synchronizing instruction is executed and completed (822), the executing section 160 reports, to the instruction sync monitoring unit 190, the fact that the execution of instructions preceding the instruction-synchronizing instruction has been completed in the relevant executing section 160 (823).

Upon receiving the report from the executing section 160 notifying that the execution of the instructions preceding the instruction-synchronizing instruction has been completed (833), the instruction sync monitoring unit 190 makes setting of the executing section designation map 312. In more detail, the instruction sync monitoring unit 190 sets, in the executing section designation map 312 in the completion-of-execution record table 310 for the corresponding thread, a bit corresponding to the executing section 160, which has reported the completion of the execution (834). After such setting, if a match between the executing section designation map 312 and the executing section designation map 630 is detected by the comparator 322 (step S935), the instruction sync monitoring unit 190 notifies the detection of the match. Specifically, the instruction sync monitoring unit 190 notifies the establishment of the instruction sync to the relevant one of the instruction issuing units 121 to 124, which has issued the instruction-synchronizing instruction (836). Then, the instruction sync monitoring unit 190 resets the bits of the executing section designation map 312 in the completion-of-execution record table 310 for the corresponding thread (837).

Upon receiving the notice indicating the establishment of sync from the instruction sync monitoring unit 190 (815), the one of the instruction issuing units 121 to 124 resumes the issuance of the succeeding instructions in the thread (thread number 620) to which the instruction-synchronizing instruction belongs (816).

According to the embodiment of the present invention, as described above, since the instruction sync monitoring unit 190 detects the completion of execution of the instructions preceding the instruction-synchronizing instruction per thread, the instruction sync can be established without stopping the execution of other threads for which the instruction sync is not performed. Also, according to the embodiment, the instruction sync can be established with combination of small-scale circuits, i.e., the completion-of-execution record table 310, the selector 321, and the comparator 322. Therefore, the desired instruction sync can be realized without increasing the circuit scale of the processor 100 to execute the instruction sync.

In the above-described embodiment, the executing section designation map 312 in the completion-of-execution record table 310 is reset in advance, and the match between the executing section designation map 312 and the executing section designation map 630 is detected by setting the corresponding bit of the executing section designation map 312 whenever the report notifying the completion of execution of the instruction-synchronizing instruction is received. However, the embodiment may be modified such that the contents of the executing section designation map 630 are set in the executing section designation map 312 when the instruction sync monitoring request is received, and the corresponding bit of the executing section designation map 312 is reset whenever the report notifying the completion of execution of the instruction-synchronizing instruction is received. In such a case, the comparator 322 detects clearing of the preset bits of the executing section designation map 312. That modification will be described in more detail below.

Figure 11:
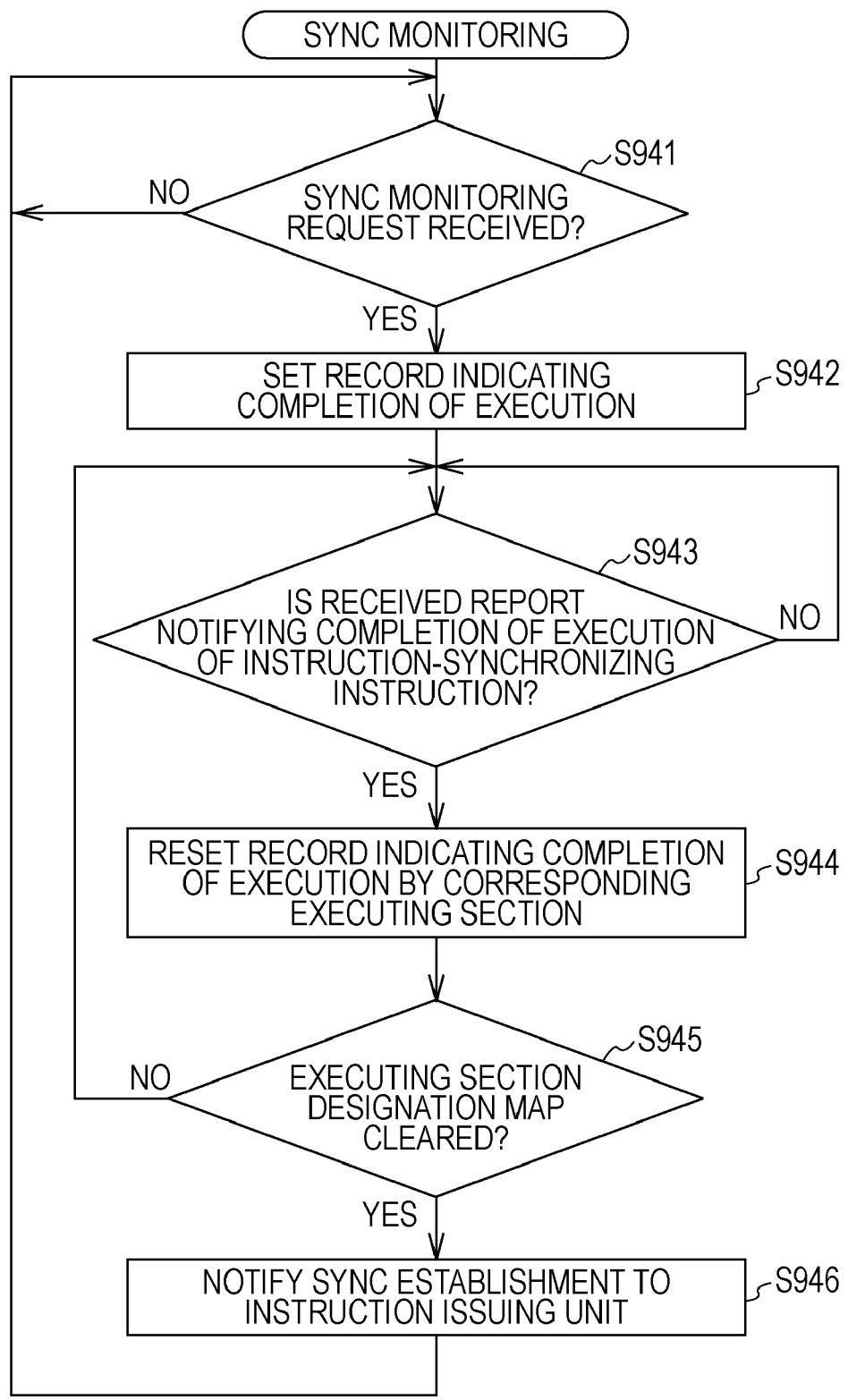
FIG. 11 is a flowchart illustrating a modification of the processing procedures executed by the instruction sync monitoring unit 190 in the embodiment of the present invention.

FIG. 11 is a flowchart illustrating the modification of the processing procedures executed by the instruction sync monitoring unit 190 in the embodiment of the present invention.

Upon receiving the instruction sync monitoring request from some one of the instruction issuing units 121 to 124 (step S941), the instruction sync monitoring unit 190 starts monitoring of the instruction sync for the relevant thread. At that time, the instruction sync monitoring unit 190 sets the contents of the executing section designation map 630 in the executing section designation map 312 in the completion-of-execution record table 310 for the corresponding thread (step S942).

Upon receiving, in such a state, the report from the executing section 160 notifying that the execution of the instructions preceding the instruction-synchronizing instruction has been completed (step S943), the instruction sync monitoring unit 190 resets the executing section designation map 312 (step S944). In more detail, the instruction sync monitoring unit 190 resets, in the executing section designation map 312 in the completion-of-execution record table 310 for the corresponding thread, a bit corresponding to the executing section 160, which has reported the completion of the execution (step S934). After such resetting, if clearing of all the bits of the executing section designation map 312 is not detected by the comparator 322 (step S945), the processing subsequent to step S943 is repeated until the clearing of all the bits is detected.

If the clearing of all the bits of the executing section designation map 312 is detected by the comparator 322 (step S945), the instruction sync monitoring unit 190 notifies the detection of the clearing of all the bits. Specifically, the instruction sync monitoring unit 190 notifies the establishment of the instruction sync to the relevant one of the instruction issuing units 121 to 124, which has issued the instruction-synchronizing instruction (step S946).

While the instruction sync is monitored by using one completion-of-execution detecting unit 320 in the above-described embodiment, the completion-of-execution detecting unit 320 may be provided plural as described below.

Figure 12:
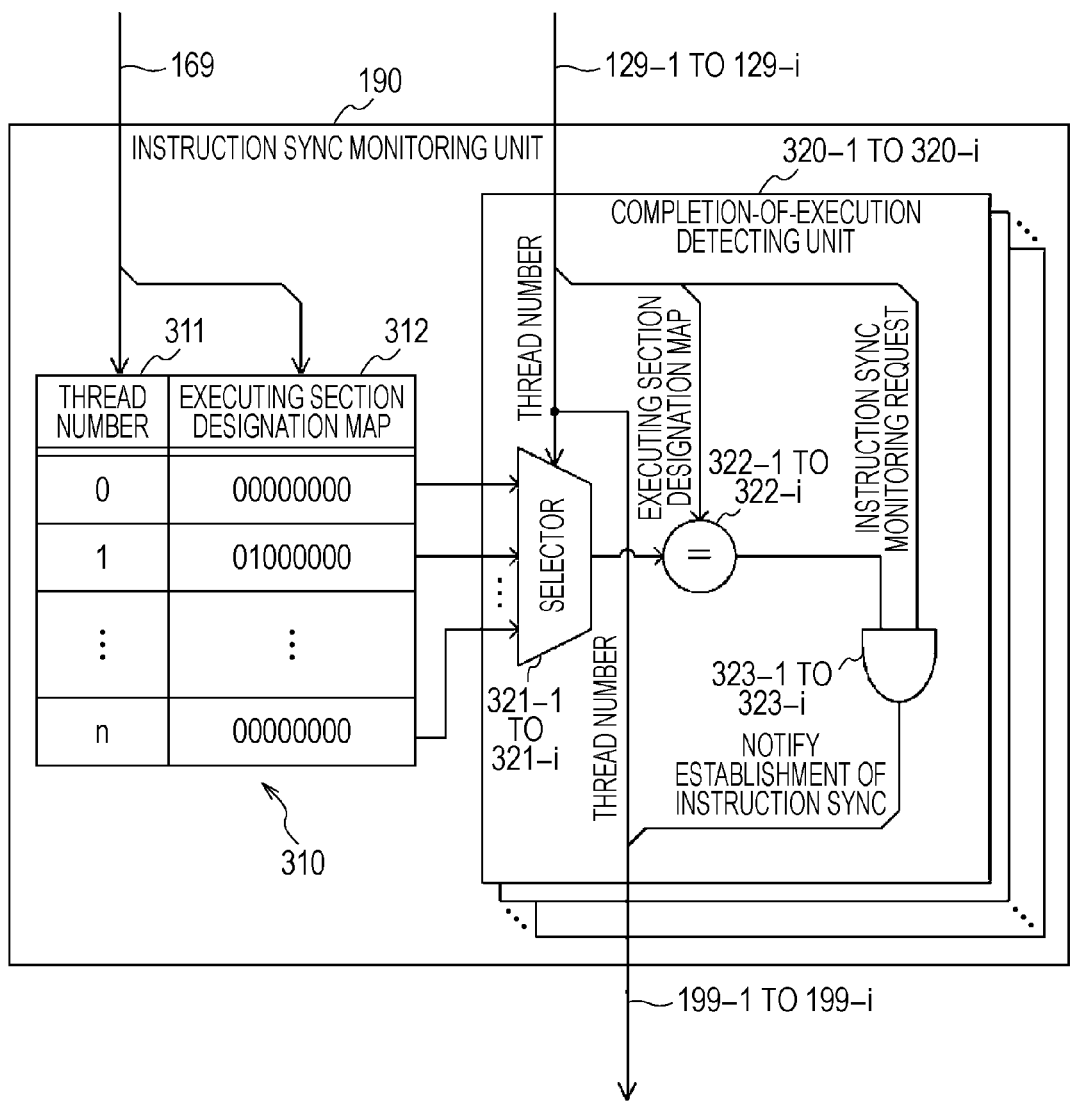
FIG. 12 is a block diagram illustrating a first modification of the instruction sync monitoring unit 190 in the embodiment of the present invention.

FIG. 12 is a block diagram illustrating a first modification of the instruction sync monitoring unit 190 in the embodiment of the present invention. The first modification of the instruction sync monitoring unit 190 includes a plurality of completion-of-execution detecting units 320. More specifically, a number i (i is an integer) of completion-of-execution detecting units 320-1 to 320-i are provided to be able to monitor the instruction sync for different threads in parallel. While, in the first modification, the thread number is designated in each of the completion-of-execution detecting units 320-1 to 320-i in accordance with the request from the instruction issuing units 121 to 124, the thread number may be held fixed as described below.

Figure 13:
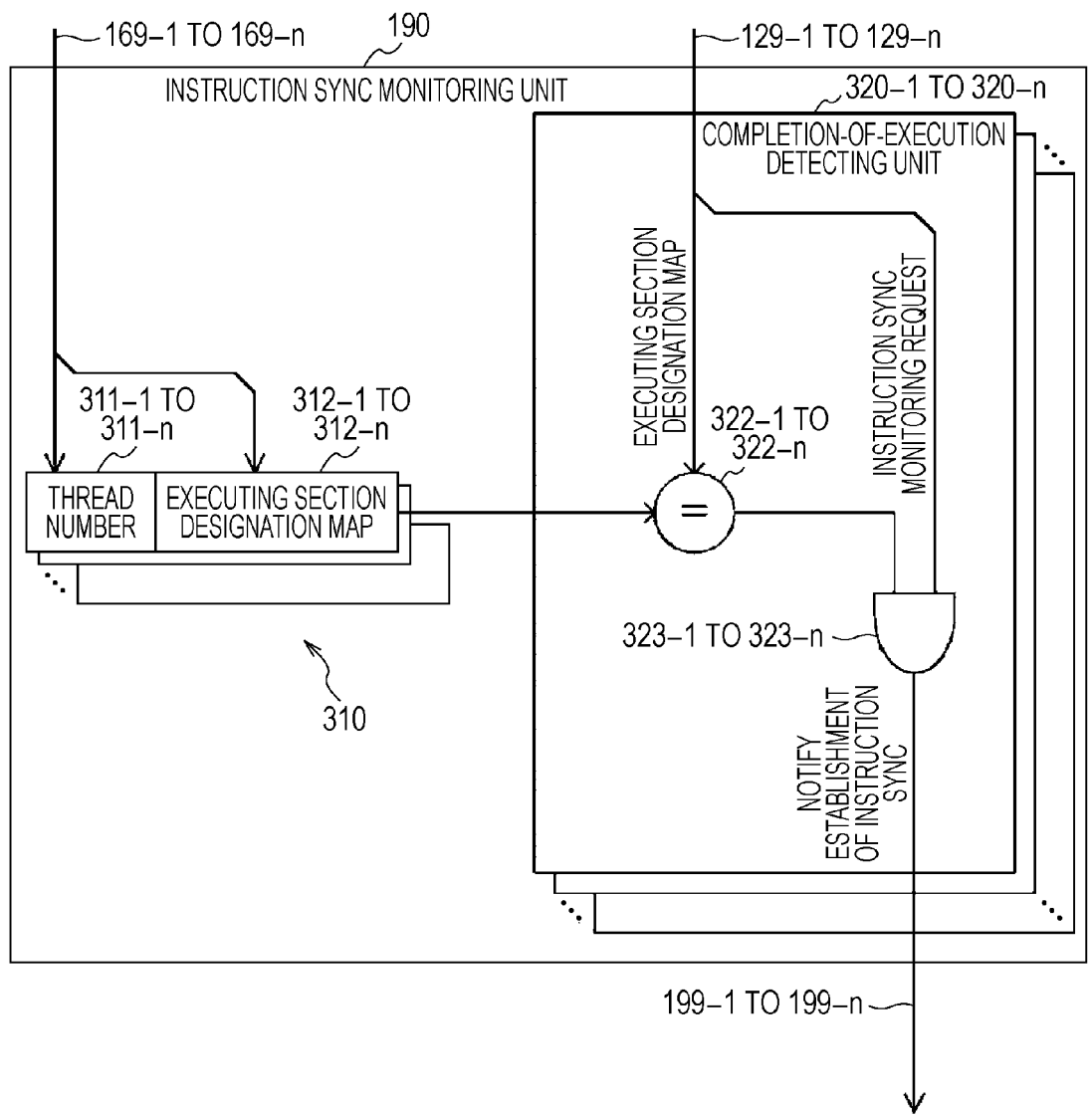
FIG. 13 is a block diagram illustrating a second modification of the instruction sync monitoring unit 190 in the embodiment of the present invention.

FIG. 13 is a block diagram illustrating a second modification of the instruction sync monitoring unit 190 in the embodiment of the present invention. In the second modification of the instruction sync monitoring unit 190, the selector 321 is not provided and completion-of-execution detecting units 320-1 to 320-n correspond to entries of the completion-of-execution record table 310 in an one-to-one relation. Therefore, the instruction sync can be monitored for different threads in parallel with a smaller-scale circuit configuration.

While the embodiment of the present invention has been described above on an assumption that eight computing units, etc. are includes as the executing sections 160, the present invention is not limited to such a configuration and an arbitrary number of computing units, etc. may be included as the executing sections 160. Also, while the embodiment has been described above on an assumption of using the special computing units for the moving-image codec, the present invention is not limited to that embodiment.

While, in the embodiment of the present invention, the bit map format is assumed as the format of the executing section designation map 312 in the completion-of-execution record table 310, the present invention is not limited to the use of the bit map format, and the executing section designation map 312 may be encoded in some other suitable particular format.

Further, while the embodiment of the present invention has been described as connecting each of the computing units, etc. i.e., each executing section 160, and the instruction sync monitoring unit 190 through the signal line 169, the present invention is not limited to that embodiment and a common bus, etc. may also be used for the connection between them.

The above-described embodiment of the present invention is merely one example for implementing the present invention, and the components used in the embodiment correspond, as described above, to respective elements specified in claims. It is, however, to be noted that the present invention is not limited to the above-described embodiment and can be variously modified without departing from the scope of the invention.

Additionally, the processing procedures described above in the embodiment of the present invention may be construed as a method including a sequence of the procedures, or may be construed as a program for causing a computer to execute the sequence of the procedures or a recording medium storing the program. Practical examples of such a recording medium include, for example, a CD (Compact Disc), an MD (Mini-Disc), a DVD (Digital Versatile Disc), a memory card, a Blu-ray Disc (registered trademark).

The present application contains subject matter related to that disclosed in Japanese Priority Patent Application JP 2008-177520 filed in the Japan Patent Office on Jul. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A processor comprising:
   a plurality of executing sections configured to simultaneously execute instructions for a plurality of threads;
   an instruction issuing section configured to issue instructions to the plurality of executing sections, the instructions comprising an instruction-synchronizing instruction, wherein the instruction-synchronizing instruction instructs that instructions preceding the instruction-synchronizing instruction complete before issuance of instructions succeeding the instruction-synchronizing instruction; and
   an instruction sync monitoring section configured to, when the instruction-synchronizing instruction is issued to one or more executing sections of the plurality of executing sections, monitor completion of execution of the instruction-synchronizing instruction for each of the one or more executing sections to detect completion of execution of preceding instructions preceding the instruction-synchronizing instruction for a thread to which the instruction-synchronizing instruction belongs, wherein:
   the instruction-synchronizing instruction comprises a thread identifier of the thread that is a target of the instruction-synchronizing instruction and an identifier of each of the one or more executing sections to which the instruction-synchronizing instruction has been issued; and
   after issuing the instruction-synchronizing instruction, the instruction issuing section stops issuance of succeeding instructions succeeding the instruction-synchronizing instruction for the thread identified by the thread identifier in the instruction-synchronizing instruction, until the completion of execution of the preceding instructions for the thread identified by the thread identifier in the instruction-synchronizing instruction is detected by the instruction sync monitoring section.

2. The processor according to claim 1, wherein:
   the instruction-synchronizing instruction includes a thread identifier field indicating the thread identifier of the thread to which the instruction-synchronizing instruction belongs, and an executing-section designation field comprising an indicator designating the one or more executing sections of the plurality of executing sections for which the completion of execution of the preceding instructions is to be detected, and
   the instruction sync monitoring section detects that execution of the preceding instructions, which belong to the thread indicated in the thread identifier field, has been completed in the one or more of the plurality of executing sections, which are designated in the executing-section designation field.

3. The processor according to claim 2, wherein the instruction sync monitoring section comprises:
a completion-of-execution record section configured to record, per thread, whether the execution of the preceding instructions in each of the plurality of executing sections has been completed, and
a completion-of-execution detecting section configured to detect the completion of execution of the preceding instructions in all ones of the plurality of executing sections, which are designated in the executing-section designation field, by comparing a record in the completion-of-execution record section with a designation in the executing-section designation field.

4. The processor according to claim 3, wherein the completion-of-execution detecting section comprises:
a selector configured to select detection or non-detection of the completion of execution of the preceding instructions, which is recorded in the completion-of-execution record section, in accordance with the thread identifier field;
a comparator configured to compare the detection or the non-detection of the completion of execution of the preceding instructions, which has been selected by the selector, with a designation of the one or more of the plurality of executing sections, which are indicated in the executing-section designation field; and
an output section configured to output, as a detection result of the completion-of-execution detecting section, a result of the comparison when the instruction-synchronizing instruction is issued by the instruction issuing section.

5. A method of operating a computing device comprising at least one processor, the method comprising, by the at least one processor:
issuing, to at least one executing section of a plurality of executing sections configured to simultaneously execute instructions for a plurality of threads, an instruction-synchronizing instruction, wherein the instruction-synchronizing instruction instructs that instructions preceding the instruction-synchronizing instruction complete before issuance of instructions succeeding the instruction-synchronizing instruction; and
in response to the instruction-synchronizing instruction,
monitoring completion of execution of the instruction-synchronizing instruction by the at least one executing section to detect completion of execution of preceding instructions preceding the instruction-synchronizing instruction for at least one thread to which the instruction-synchronizing instruction belongs, wherein the instruction-synchronizing instruction comprises a thread identifier of the at least one thread that is a target of the instruction-synchronizing instruction and an identifier of the at least one executing section; and
stopping issuance of succeeding instructions succeeding the instruction-synchronizing instruction for the at least one thread identified by the thread identifier in the instruction-synchronizing instruction, until the completion of execution of the preceding instructions for the at least one thread identified by the thread identifier in the instruction-synchronizing instruction is detected.

6. The method according to claim 5, wherein:
the instruction-synchronizing instruction includes a thread identifier field indicating the thread identifier of the at least one thread to which the instruction-synchronizing instruction belongs, and an executing-section designation field comprising an indicator designating the at least one executing section of the plurality of executing sections for which the completion of execution of the preceding instructions is to be detected, and
the method further comprises detecting that execution of the preceding instructions, which belong to the at least one thread indicated in the thread identifier field, has been completed in the at least one execution section designated in the executing-section designation field.

7. The method according to claim 6, wherein:
the executing-section designation field indicates, for each of the plurality of executing sections, whether completion of execution of instructions preceding the instruction-synchronizing instruction is to be detected; and
the method further comprises:
recording, in a record, for each of the at least one thread, whether the execution of the preceding instructions in each of the at least one executing section has been completed; and
detecting the completion of execution of the preceding instructions in all of the at least one executing section each designated by a corresponding identifier in the executing-section designation field, by comparing the record with the executing-section designation field.

8. The method according to claim 7, wherein detecting the completion of execution of the preceding instructions comprises:
selecting detection or non-detection of the completion of execution of the preceding instructions, which is recorded in the record, in accordance with the thread identifier field;
comparing the selected detection or the non-detection of the completion of execution of the preceding instructions, with the indicator designating the at least executing section in the executing-section designation field; and
outputting a result of the comparison in response to issuance of the instruction-synchronizing instruction.

9. An apparatus comprising at least one processor, the at least one processor comprising:
a plurality of executing sections configured to simultaneously execute instructions for a plurality of threads;
an instruction issuing section configured to issue instructions to the plurality of executing sections, the instructions comprising an instruction-synchronizing instruction, wherein the instruction-synchronizing instruction instructs that instructions preceding the instruction-synchronizing instruction complete before issuance of instructions succeeding the instruction-synchronizing instruction; and
an instruction sync monitoring section configured to, when the instruction-synchronizing instruction is issued to one or more executing sections of the plurality of executing sections, monitor completion of execution of the instruction-synchronizing instruction for each of the one or more executing sections to detect completion of execution of preceding instructions preceding the instruction-synchronizing instruction for a thread to which the instruction-synchronizing instruction belongs; wherein:
the instruction-synchronizing instruction comprises a thread identifier of the thread that is a target of the instruction-synchronizing instruction and an identifier of each of the one or more executing sections to which the instruction-synchronizing instruction has been issued, and after issuing the instruction-synchronizing instruction, the instruction issuing section stops issuance of succeeding instructions succeeding the instruction-synchronizing instruction for the thread identified by the thread identifier in the instruction-synchronizing instruction, until the completion of execution of the preceding instructions for the thread identified by the thread identifier in the instruction-synchronizing instruction is detected by the instruction sync monitoring section.

10. The apparatus according to claim 9, wherein:

the instruction-synchronizing instruction includes a thread identifier field indicating the thread identifier and an executing-section designation field comprising an indicator designating the one or more executing sections; and the instruction sync monitoring section detects that execution of the preceding instructions, which belong to the thread indicated in the thread identifier field, has been completed in the one or more of the plurality of executing sections, which are designated in the executing-section designation field.

11. The apparatus according to claim 10, wherein the instruction sync monitoring section comprises:

a completion-of-execution record section configured to record, per thread, whether the execution of the preceding instructions in each of the plurality of executing sections has been completed, and a completion-of-execution detecting section configured to detect the completion of execution of the preceding instructions in all ones of the plurality of executing sections, which are designated in the executing-section designation field, by comparing a record in the completion-of-execution record section with a designation in the executing-section designation field.

12. The apparatus according to claim 11, wherein the completion-of-execution detecting section comprises:

a selector configured to select detection or non-detection of the completion of execution of the preceding instructions, which is recorded in the completion-of-execution record section, in accordance with the thread identifier field;

a comparator configured to compare the detection or the non-detection of the completion of execution of the preceding instructions, which has been selected by the selector, with a designation of the one or more of the plurality of executing sections, which are indicated in the executing-section designation field; and an output section configured to output, as a detection result of the completion-of-execution detecting section, a result of the comparison when the instruction-synchronizing instruction is issued by the instruction issuing section.

* * * * *